(12) United States Patent
Birman

(10) Patent No.: US 7,780,304 B2
(45) Date of Patent: Aug. 24, 2010

(54) SMOKED LENS FOR VEHICLE

(75) Inventor: Vyacheslav B. Birman, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1394 days.

(21) Appl. No.: 11/175,512

(22) Filed: Jul. 6, 2005

(65) Prior Publication Data

US 2006/0062004 A1 Mar. 23, 2006

Related U.S. Application Data

(60) Provisional application No. 60/607,402, filed on Sep. 3, 2004.

(51) Int. Cl.
*F21V 9/14* (2006.01)
(52) U.S. Cl. ............... 362/19; 362/23; 362/27; 362/28; 362/30; 362/489
(58) Field of Classification Search ............... 362/19, 362/23, 27, 28, 29, 30, 615, 618, 622, 471, 362/489; 359/493, 501, 601, 602, 609, 613
See application file for complete search history.

(56) References Cited

U.S. PATENT DOCUMENTS

| 4,895,432 | A | | 1/1990 | Iwashita et al. | |
|---|---|---|---|---|---|
| 5,486,840 | A | * | 1/1996 | Borrego et al. | 345/7 |
| 6,020,945 | A | | 2/2000 | Sawai et al. | |
| 6,141,071 | A | * | 10/2000 | Sharp | 349/121 |
| 6,222,672 | B1 | * | 4/2001 | Towler et al. | 359/465 |
| 6,392,727 | B1 | | 5/2002 | Larson et al. | |
| 6,741,788 | B2 | | 5/2004 | Steiner | |
| 6,771,327 | B2 | * | 8/2004 | Sekiguchi | 349/12 |
| 6,956,630 | B2 | * | 10/2005 | Ariyoshi et al. | 349/63 |
| 2003/0098856 | A1 | * | 5/2003 | Li | 345/173 |
| 2005/0057701 | A1 | | 3/2005 | Weiss | |
| 2005/0175796 | A1 | * | 8/2005 | Nakamura et al. | 428/32.8 |

FOREIGN PATENT DOCUMENTS

DE 32 33 301 A1 3/1984

OTHER PUBLICATIONS

International Search Report, Feb. 22, 2006.

* cited by examiner

*Primary Examiner*—Jong-Suk (James) Lee
*Assistant Examiner*—Mark Tsidulko

(57) ABSTRACT

A vehicle instrument cluster lens assembly for achieving a desired smoked lens effect in a vehicle instrument panel includes a first layer having an associated polarizing orientation for transforming incident light into polarized light having a first orientation that corresponds to the polarizing orientation. A second layer receives the polarized light and shifts the first orientation of the polarized light to a second orientation that is different than the first orientation. A surface receives the polarized light from the second layer and at least partially reflects the polarized light in a direction toward the second layer. The second layer shifts the second orientation of the polarized light to a third orientation that is different from the polarizing orientation of the first layer to prevent the polarized light from being transmitted to a vehicle occupant.

10 Claims, 2 Drawing Sheets

US 7,780,304 B2

SMOKED LENS FOR VEHICLE

CROSS-REFERENCE TO RELATED APPLICATIONS

The application claims priority to U.S. Provisional Application No. 60/607,402, filed on Sep. 3, 2004.

BACKGROUND OF THE INVENTION

This invention relates to vehicle displays and, more particularly, to a vehicle lens assembly having a polarizer and a light retarder for reducing vehicle occupant glare.

Vehicle displays, such as instrument clusters having a speedometer and a tachometer instrument, typically display important vehicle information to the occupants of the vehicle. Conventional vehicle displays typically include a housing that supports a circuit board. One or more light sources are typically mounted on the circuit board to illuminate a display surface within the housing, to power the instruments, and to illuminate the instruments. A clear, transparent lens is mounted on the front of the housing between the vehicle occupants and the illuminated display surface to protect the display surface and instruments.

Selected vehicle displays utilize a smoked lens mounted on the front of the housing instead of the clear lens. In addition to protecting the display surface and instruments, the smoked lens provides a desirable appearance (i.e., a smoked lens effect). To produce the smoked lens effect, conventional smoked lens are heavily tinted to obscure the appearance of the instruments when the vehicle is turned off such that the instruments are only minimally visible to a vehicle occupant. When the vehicle is on, the light sources illuminate the instruments and are visible to the vehicle occupant through the smoke lens.

Generally, to maximize the smoked lens effect it is desirable to prevent light from the surrounding environment from entering through the smoked lens and reflecting off of the display surface. Conventional smoked lenses allow the reflected light to be transmitted back through the smoked lens to the vehicle occupant. This may undesirably increase the visibility of the instruments when the vehicle is turned off, and diminish the smoked lens effect.

Accordingly, there is a need for a vehicle instrument cluster lens assembly that prevents light reflected off of the display surface from being transmitted back through a lens to a vehicle occupant to provide a more desirable smoked lens effect.

SUMMARY OF THE INVENTION

An example vehicle instrument cluster lens assembly for a vehicle instrument panel according to the present invention includes a first layer that has an associated polarizing orientation for transforming incident light into linearly polarized light having a first orientation that corresponds to the polarizing orientation. A second layer receives the linearly polarized light and shifts the first orientation of the linearly polarized light to a second orientation that is different than the first orientation. A surface receives the linearly polarized light from the second layer and at least partially reflects the linearly polarized light in a direction towards the second layer. The second layer then shifts the second orientation of the linearly polarized light to a third orientation that is different from the polarizing orientation of the first layer such that the first layer will absorb the linearly polarized light.

In one example, the vehicle lens assembly according to the present invention includes a polarizer that has an associated polarizing orientation for transforming incident light into linearly polarized light having a first orientation that corresponds to a polarizing orientation. A light retarder receives the linearly polarized light and shifts the first orientation of the linearly polarized light to a second orientation that is different form the first orientation. A surface receives the linearly polarized light from the light retarder and reflects the linearly polarized light in a direction toward the light retarder. The light retarder shifts the second orientation of the linearly polarized light to a third orientation that is different from the polarizing orientation of the polarizer. A light source emits a display light through the surface toward the polarizer. The surface transmits at least a portion of the display light toward the polarizer.

A method of achieving a desired smoked lens effect in a vehicle instrument cluster lens assembly according to the present invention includes the step of polarizing incident light to produce linearly polarized light having a first orientation and shifting the first orientation of the linearly polarized light to a second orientation that is different than the first orientation. These steps are followed by the step of reflecting the linearly polarized light to produce reflected linearly polarized light having the second orientation and shifting the second orientation of the reflected linearly polarized light to a third orientation that is different than the second orientation. In another step, the reflected linearly polarized light is absorbed to prevent it from being transmitted to the vehicle occupants.

Accordingly, this invention provides an instrument cluster lens assembly having a polarizer and a light retarder that cooperate to prevent incident light that enters the instrument cluster from escaping while allowing transmittance of display light through the lens.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
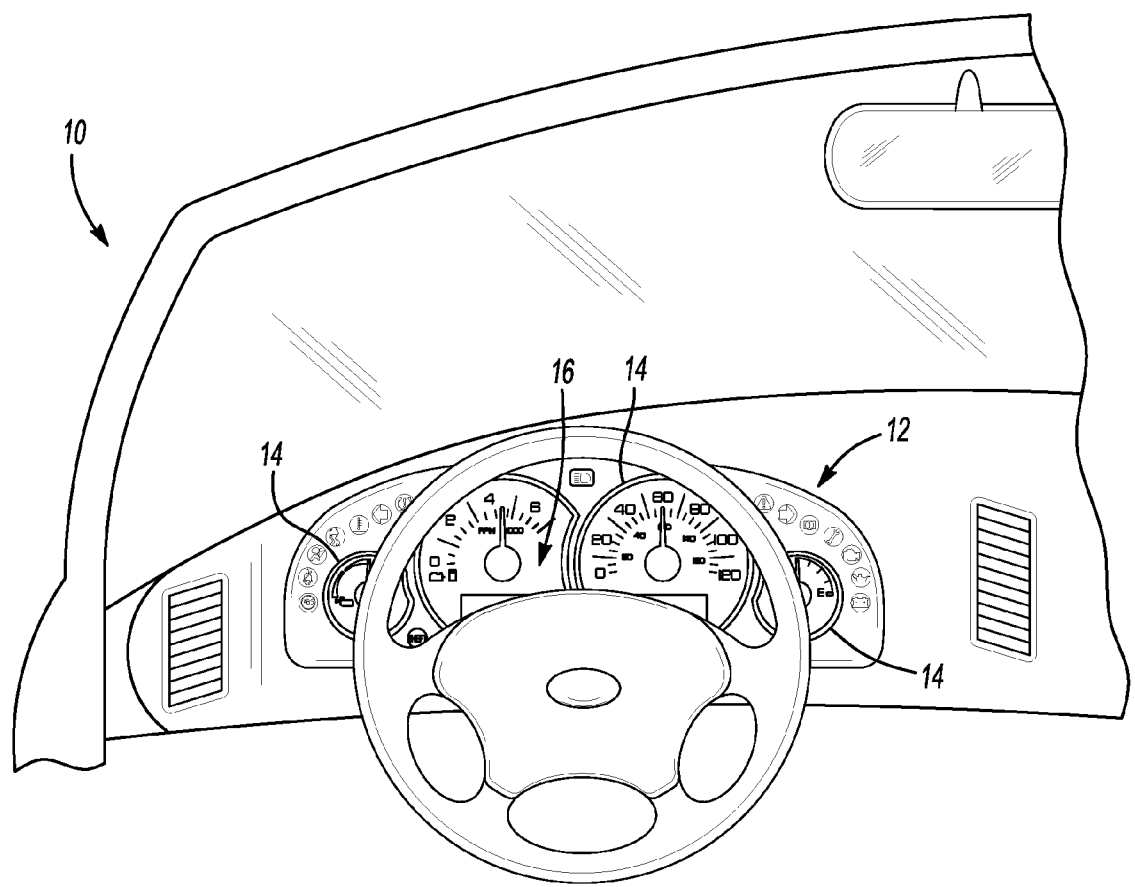
FIG. 1 illustrates selected portions of a vehicle having an example instrument panel according to the present invention.

FIG. 1 illustrates selected portions of a vehicle 10 having an instrument panel 12, such as a vehicle instrument cluster that communicates vehicle information to occupants of the vehicle 10. In the illustrated example, the instrument panel 12 includes vehicle instruments 14, such as a speedometer or a tachometer. An illuminable display surface 16 behind the instruments 14 provides numbers, letters, or a scale, for example, for utilization of the instruments 14.

Figure 2:
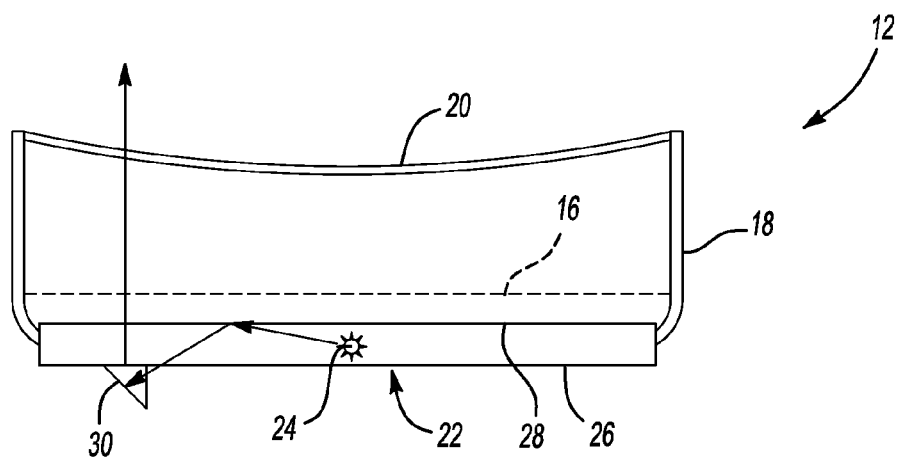
FIG. 2 illustrates selected portions of the example instrument panel of FIG. 1 having a vehicle lens assembly according to the present invention.

Referring to FIG. 2, the instrument panel 12 of FIG. 1 is shown schematically and includes a housing 18 that supports a lens 20. In this example, a light guide assembly 22 located opposite from the lens 20 includes a light source 24 for illuminating the illuminable display surface 16. The light source 24 produces a display light that travels through a light guide 26, internally reflecting off of surfaces 28 of the light guide 26. A light reflector 30 within the light guide 26 receives the display light and reflects the display light out of the light guide 26 toward the lens 20.

Figure 3:
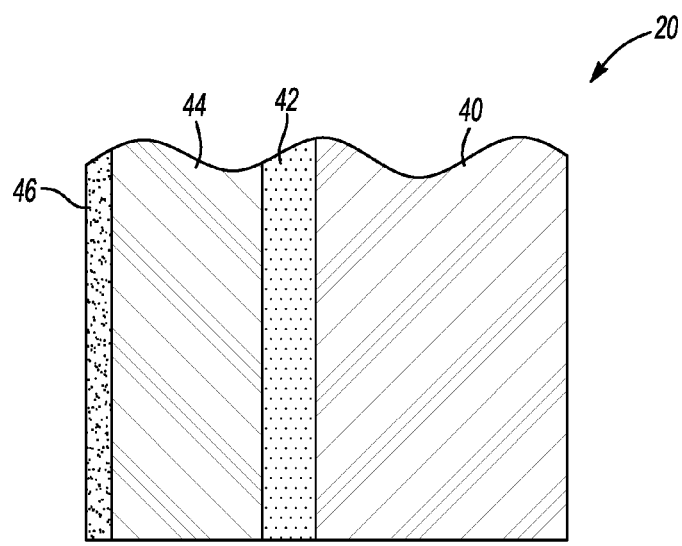
FIG. 3 schematically illustrates the layers of an example vehicle lens assembly.

FIG. 3 schematically illustrates a portion of the lens 20. In this example, the lens 20 includes an acrylic substrate layer 40 that supports a light retarder layer 42. The light retarder layer 42 is between the acrylic substrate and a polarizer layer 44. An anti-reflecting film 46 is disposed on the polarizer layer 44 in this example. Preferably, the anti-reflecting film 46 is made of one of a magnesium fluoride, zinc sulfide, titanium dioxide, or calcium fluoride material. The example configuration of layers of the lens 20 provides the benefit of preventing incident light from reflecting off of the illuminable display surface 16 and being transmitted back through the lens 20 while allowing display light from the light guide to be transmitted through the lens 20, as described below.

Figure 4:
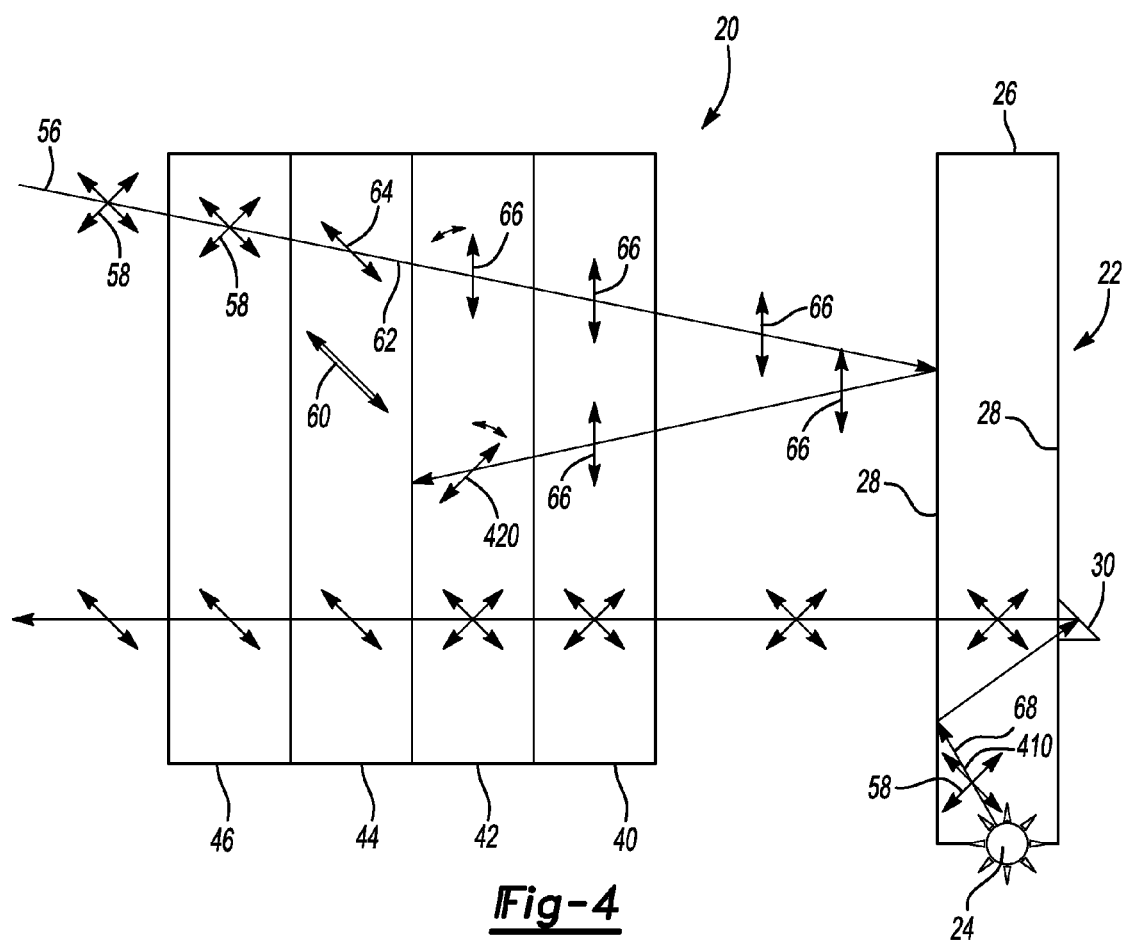
FIG. 4 schematically illustrates a vehicle lens assembly operating to reduce glare.

Referring to the example shown in FIG. 4, the lens 20 receives incident light 56 from the surroundings of the vehicle 10. In this example, the incident light 56 is unpolarized, as represented by the arrows 58. The term unpolarized as used in this description refers to electromagnetic components of the incident light 56 having a plurality of directions that are orthogonal to the propagation direction of the incident light 56. In this illustration, the incident light 56 is transmitted through the anti-reflecting film 46 and is not polarized by the anti-reflecting film 46.

The polarizer layer 44 has an associated polarizing orientation 60. In this example, the polarizer layer 44 allows the electromagnetic components of the incident light 56 that are aligned with the polarizing orientation 60 to pass through the polarizer layer 44 while absorbing the electromagnetic components of the incident light 56 that are not aligned with the polarizing orientation 60. That is, the polarizing orientation 60 is linear and allows light in a single to pass. Thus, the polarizer layer 44 transforms the incident light 56 into linearly polarized light 62 having an associated first orientation that corresponds to the polarizing orientation 60 of the polarizer layer 44.

The linearly polarized light 62 is received by the light retarder layer 42 from the polarizer layer 44. The light retarder layer 42 shifts the first orientation 64 of the linearly polarized light 62 approximately 45° clockwise in the illustration to a second orientation 66. The linearly polarized light 62 continues from the light retarder layer 42 through the acrylic substrate 40 without the acrylic substrate 40 significantly shifting the orientation of the linearly polarized light 62. In this example, the acrylic substrate layer 40 is optically inactive. That is, the acrylic substrate layer 40 does not significantly polarize, reflect, or diffract light that passes through the acrylic substrate layer 40.

The linearly polarized light 62 impinges upon the surface 28 of the light guide 26 and reflects off the surface 28 back toward the lens 20. Upon reflecting off of the surface 28, the second orientation 66 of the linearly polarized light 62 is not changed. The linearly polarized light 62 propagates back through the acrylic substrate layer 40 and into the light retarder layer 42. The light retarder layer 42 shifts the second orientation 66 of the linearly polarized light 62 45° in the clockwise direction in the illustration to a third orientation 420.

In this example, the third orientation 420 is orthogonal to the polarizing orientation 60 of the polarizer layer 44. As a result, when the linearly polarized light 62 having the third orientation 420 impinges upon the polarizer layer 44, the polarizer layer 44 absorbs the linearly polarized light 62 rather than transmitting it through to the vehicle occupants. Thus, incident light 56 that would otherwise reflect back to a vehicle occupant and diminish the smoked lens effect in previously known instrument panel assemblies is absorbed by the lens 20 and thereby prevented from reaching the vehicle occupants.

In one example, the polarizer layer 44 is made of a polyethylene material. Preferably, the polyethylene material comprises a relatively thin film that is directionally stretched to orient the molecules of the polyethylene material, as is known to produce a polarizing effect. Preferably, the light retarder layer 42 is made of a polymer material. Alternatively, the light retarder layer 42 can be made of an inorganic material or an inorganic material that includes mica, however, these materials are brittle and may not be suited to highly curved lens shapes.

In another example, the light retarder layer 42 and the polarizer layer 44 are made thick enough such that the acrylic substrate layer 40 is not needed for physical support.

The light source 24 produces a display light 68, in a first direction 410 towards a reflector 30 that propagates through the light guide 26. The display light 68 is unpolarized in this example, as represented by 58. The display light 68 is received by the light reflector 30, which reflects the display light 68 through the surfaces 28 toward the lens 20. The reflection of the display light 68 does not significantly change or polarize the display light 68.

The display light 68 is received by the acrylic substrate layer 40, which as described above is not optically active. The light retarder layer 42 shifts the orientation of the display light 68. However, in this example since the display light 68 is unpolarized, the shift in orientation has no effect. The display light 68 is received by the polarizer layer 44, which transmits electromagnetic components of the display light 68 that are aligned with the polarizing orientation 60 and absorbs electromagnetic components of the display light 68 that are transverse to the polarizing orientation 60. Thus, the display light 68 that is transmitted from the polarizer layer 44 has an orientation that corresponds to the polarizing orientation 60. The loss of some components of the electromagnetic components of the display light 68 reduces the intensity of the display light 68, however, the reduction in intensity is similar to or less than previously known smoked lenses that include a tint for example.

The example lens 20 provides the benefit of absorbing a large percentage of incident light 56 reflected off of the instrument panel 12 while allowing transmission of display light from the light source 24 to provide a desirable smoked lens effect. In one example, approximately 99% of the incident light 56 is absorbed by the polarizer layer 44. That is, only about 1% of the incident light 56 that enters the instrument panel 12 through the lens 20 is reflected back to a vehicle occupant. In another example, the display light 68 from the light source 24 intensity is reduced by one-half by the polarizer 44, which is a generally accepted loss of intensity for illuminable surfaces within an instrument panel.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A vehicle instrument cluster lens assembly for reducing glare comprising:

a first layer having a polarizing orientation for transforming incident light into polarized light having a first orientation that corresponds to the polarizing orientation:

a second layer for receiving the polarized light and shifting the first orientation of the polarized light to a second orientation that is different than the first orientation;

a light guide comprising a first interior surface facing a second surface for propagating light from a display light, the display light connected to said light guide, and at least partially external to said light guide, to a reflector having a reflector surface which reflects light from the light guide through the interior facing surface and the second surface toward the second layer and having an outer surface for receiving polarized light from the second layer and at least partially reflecting the polarized light in a direction toward the second layer, wherein the second layer shifts the second orientation of the polarized light to a third orientation that is different from the polarizing orientation of the first layer.

2. The assembly as recited in claim 1, wherein the second orientation is shifted about 45° from the first orientation.

3. The assembly as recited in claim 1, wherein the second orientation is shifted about 90° from the polarizing orientation.

4. The assembly as recited in claim 1, further comprising an anti-refection layer on the first layer for reflecting at least a portion of the incident light before the incident light impinges upon the first layer.

5. The assembly as recited in claim 4, wherein the anti-reflection layer comprises at least one of magnesium fluoride, zinc sulfide, titanium dioxide, and calcium fluoride.

6. The assembly as recited in claim 1, wherein the first layer comprises a polyethylene film.

7. The assembly as recited in claim 1, wherein the second layer comprises at least one of a polymer film, an inorganic layer, and a layer including mica.

8. The assembly as recited in claim 1, further comprising an acrylic substrate between the second layer and the surface, the acrylic substrate supporting the second layer.

9. The assembly as recited in claim 1, wherein the light guide comprises a light source for emitting a display light in a first direction toward a light reflector, the light reflector reflecting the display light in a second direction that is transverse to the first direction and toward the surface, the surface transmitting at least a portion of the display light toward the second layer.

10. The assembly as recited in claim 1, wherein the polarizing orientation is linear for transforming the incident light into linearly polarized light.

* * * * *